United States Patent
Barowski et al.

(10) Patent No.: US 7,502,918 B1
(45) Date of Patent: Mar. 10, 2009

(54) METHOD AND SYSTEM FOR DATA DEPENDENT PERFORMANCE INCREMENT AND POWER REDUCTION

(75) Inventors: Harry Barowski, Boeblingen (DE); Tobias Gemmeke, Santa Clara, CA (US); Tim Niggemeier, Laatzen (DE); Thomas Pflueger, Leinfelden (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/058,256

(22) Filed: Mar. 28, 2008

(51) Int. Cl.
*G06F 9/30* (2006.01)
(52) U.S. Cl. .............................. 712/226; 712/209
(58) Field of Classification Search .............. 712/209, 712/227, 226, 217
See application file for complete search history.

(56) References Cited

U.S. PATENT DOCUMENTS

| | | | |
|---|---|---|---|
| 4,236,204 A * | 11/1980 | Groves | 712/226 |
| 4,439,828 A * | 3/1984 | Martin | 712/226 |
| 5,619,665 A * | 4/1997 | Emma | 712/208 |
| 5,632,023 A | 5/1997 | White et al. | |
| 5,925,124 A * | 7/1999 | Hilgendorf et al. | 712/227 |
| 5,978,907 A | 11/1999 | Tran et al. | |
| 6,061,777 A | 5/2000 | Cheong et al. | |
| 6,233,675 B1 * | 5/2001 | Munson et al. | 712/227 |
| 6,480,931 B1 | 11/2002 | Buti et al. | |
| 2007/0204135 A1 | 8/2007 | Jiang | |

OTHER PUBLICATIONS

Buti, T.N., et al. "Organization and implementation of the register-renaming mapper for out-of-order IBM Power4 processors", IBM J. Res. & Dev., vol. 49, No. 1, Jan. 2005.

* cited by examiner

*Primary Examiner*—Richard Ellis
(74) *Attorney, Agent, or Firm*—McGinn IP Law Group, PLLC

(57) ABSTRACT

A method of dispatching instructions includes dispatching original instructions into an instruction buffer, including at least one operand, renaming the operand, selecting the original instructions from the instruction buffer, sending selected instructions with explicit bits, to an internal operation code exchange table, which includes replacement rules for replacing the selected instructions with a simplified instruction based on the original instructions and the explicit bits, replacing the selected instructions with the simplified instruction in accordance with the explicit bits, and issuing the simplified instructions to an execution unit by sending the simplified instruction and all explicit bits for the operands to a content addressable memory address logic of the internal operation code exchange table, wherein if a bitvector, consisting of the original instruction and the explicit bits, matches a pattern stored in the internal operation code exchange table, the original instruction is replaced by the simplified instruction.

1 Claim, 2 Drawing Sheets

METHOD AND SYSTEM FOR DATA DEPENDENT PERFORMANCE INCREMENT AND POWER REDUCTION

BACKGROUND OF THE INVENTION

1. Field of the Invention

The present invention generally relates to a method and apparatus for instruction dispatching, and more particularly to a method and apparatus for instruction dispatching in an out-of-order execution processor performing register renaming.

2. Description of the Related Art

Often instructions are executed with special values for its operands. For these special values, the applied instructions are often unnecessarily too complex. For example:

$B=A+1$ $C=A*(-1)$

In these cases, simpler instructions can be used. By using the simpler instructions, energy conversion can be reduced and performance can be increased.

SUMMARY OF THE INVENTION

In view of the foregoing and other exemplary problems, drawbacks, and disadvantages of the conventional methods and structures, an exemplary feature of the present invention is to provide a method and structure for identifying special values in the processor instruction parameters, and replacing the instructions.

In a first exemplary, non-limiting aspect of the present invention, a method of dispatching instructions includes dispatching original instructions into an instruction buffer, the original instructions including at least one operand, renaming the at least one operand, selecting the original instructions from the instruction buffer, sending selected instructions with explicit bits, which include values stored in a mapper table for each of a plurality of physical registers, to an internal operation code exchange table, which includes replacement rules for replacing the selected instructions with a simplified instruction based on the original instructions and the explicit bits, replacing the selected instructions with the simplified instruction in accordance with the explicit bits, and issuing the simplified instructions indirectly to an execution unit by sending the simplified instruction and all explicit bits for the operands to a content addressable memory address logic of the internal operation code exchange table, wherein if a bitvector, consisting of the original instruction and the explicit bits, matches a pattern stored in the internal operation code exchange table, the original instruction is replaced by the simplified instruction.

Accordingly, the use of simplified instructions reduces power consumption and/or improves the performance of the processor. Indeed, by replacing the instructions with simpler instructions, energy is preserved, there is a shorter pipeline/latency, thus, the performance is increased, and the execution unit bandwidth is reduced.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
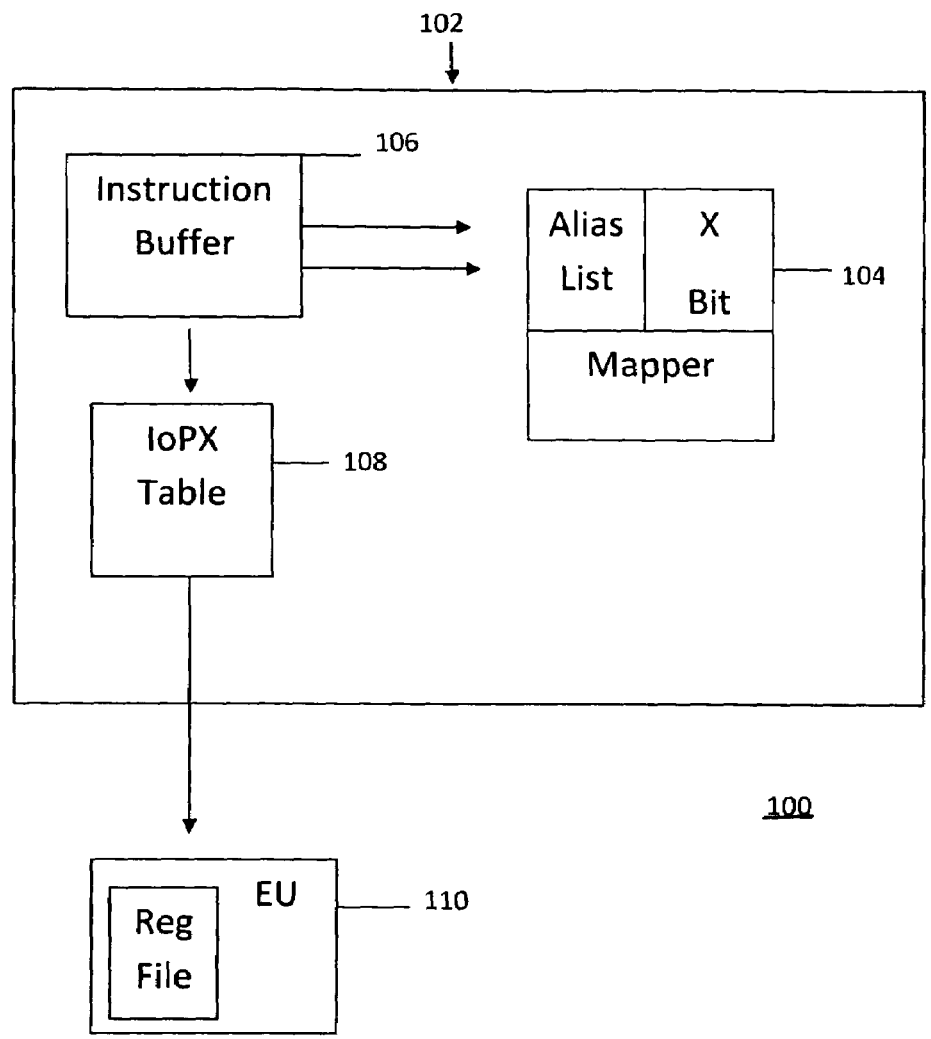
FIG. 1 illustrates a method (and system) 100 in accordance with an exemplary embodiment of the present invention.
Figure 2:
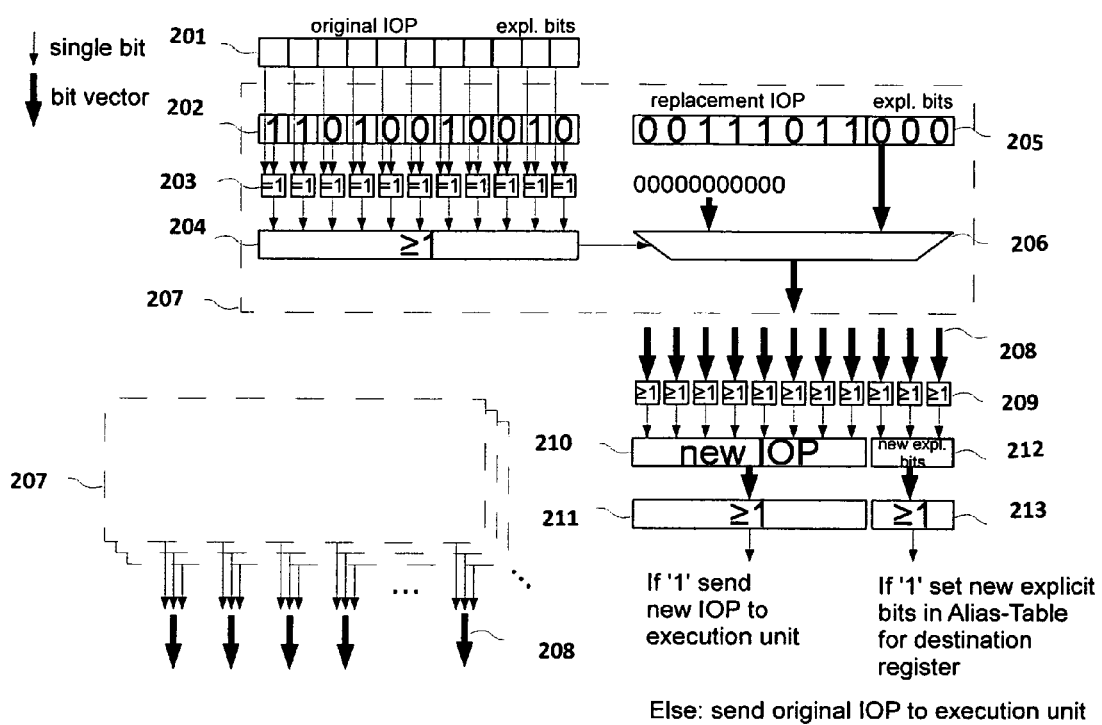
FIG. 2 illustrates further illustrates the method in accordance with an exemplary embodiment of the present invention.

Referring now to the drawings, and more particularly to FIGS. 1-2, there are shown exemplary embodiments of the method and structures according to the present invention.

FIG. 1 illustrates a system and method 100 according to certain exemplary aspects of the present invention. Instructions are dispatched (102) into an instruction buffer. Operands in the instructions are renamed, and explicit bits are read (104). Instructions are selected from the instruction buffer (pre-issue) (106). Together with explicit bits, the selected instruction is sent to the internal operation code exchange (IoPX) table (108), which allows replacement of the instruction with a simpler operation code in accordance with the explicit bits. The new instructions are issued to the execution unit (110).

The method (and apparatus) of the present invention is based on content addressable memory (CAM) addressing of the IoPX-table. This table contains replacement rules, which exchange the original internal operation code (IOP) with another simpler instruction during instruction issue to the execution units based on the original IOP and certain explicit bits.

The explicit bits mark special values stored in the mapper table for each architected register. Thus, for special values e.g. −1, 0, +1 certain explicit bits are set (presumable 'one hot' encoded). Upon instruction issue, the selected IOP is not directly issued to the execution unit, but is sent to the CAM address logic of the IoPX table together with all explicit bits for each operand.

Referring to FIG. 2, if the bitvector 201 includes the IOP and the explicit bits, which match with a stored pattern 202 in the IoPX table either the IOP is replaced by another simpler IOP 205 or in case that the result is already known for "trivial" inputs even if the IOP is suppressed but the result in terms of new explicit bits are selected. The explicit bits are concatenated for each source operands and compares are even sensitive to certain explicit bits for several operand. This is important for, for example, instructions where the result is calculated by a*c+b. Here the instruction behaves differently if a or c are e.g. "1" or the added b is "0". Thus, several replacement rules may apply for the same original instruction.

The CAM addressing includes, for example, XOR gates 203 for each bit of the incoming bitvector (including the original IOP and the explicit bits). All XOR outputs are ORed (i.e., all input signals/vectors are combined to a single output/vector by performing logical disjunction) together 204. If the bitvector matches with a replacement rule the appropriate (bitwise) compare result is 1. The replacement rules stored in the IoPX table include two halves. In the left half of each row, the bitvector of the original IOP and the special values which cause instruction replacement are stored. In the right half, the replacement IOP as well as the, if known, new explicit bits are stored.

Thus, if any rule stored in the IoPX table can be applied, then the appropriate replacement IOP or explicit bits are selected by a multiplexer (MUX) 206. The default output is all zeros, if none of the rules match with the incoming bitvector.

As the CAM compares are done in parallel, the output of the IoPX table collects all MUX outputs. Each MUX delivers a bitvector as a result of the concatenation of the new replacement IOP and new explicit bits. All MUX outputs are bitwise ORed together 209 to form a new IOP 210 and/or new explicit bits 212. Since the rules represented by a single row of the IoPX table are orthogonal, at most one CAM matches. Thus, the result includes a unique new IOP or explicit bits.

To determine whether the original IOP is finally sent to the execution unit by instruction issue, all new IOP bits are ORed together 211. If the result of the OR is non-zero, then the new IOP is issued to the execution unit instead of the original IOP.

If any of the new explicit bits 212 is non-zero, then the ORing 213 will determine that the corresponding explicit bit for the target register is set in the mapper. Thus, for combination of certain original instruction with trivial inputs, the instruction execution can be replaced by a no operation (NOP) instruction if the 'trivial' result is already known and indicated by means of the new explicit bits, which are finally transferred to the target register of the original IOP. Thus, the register file content is not updated, but the explicit bits in the mapper associated to the certain register entry override the actual content by the value indicated by the corresponding explicit bit (e.g. if the explicit bits for "0" is set) the register file entry for the architected register is treated as zero.

EXAMPLE

Simulation and analysis of specFP traces show that most floating point intensive operations deal with solving nonlinear differential equations and/or matrix multiplications. Due to Eigenvalue determination, the equation system often contains diagonal or triangular matrices (i.e. many/most of the elements of the matrices contains special values like 0, −1, +1).

Multiplication of Triangular Matrices:

$(A) \times (B) = (C)$ $c_{i,j} = \Sigma_n(a_{i,n} * b_{n,j})$ $$\begin{pmatrix} a & 0 & 0 \\ d & 1 & 0 \\ -1 & h & i \end{pmatrix} \times \begin{pmatrix} 1 & 0 & 0 \\ 0 & -1 & 0 \\ 0 & 0 & 1 \end{pmatrix} = \begin{pmatrix} a & 0 & 0 \\ d & -1 & 0 \\ -1 & -h & i \end{pmatrix}$$

calculation principal:

$c_{1,1} = a*1+0*0+0*0$ $c_{2,2} = d*0+1*(-1)+0*0$ (original) instruction sequence $c_{1,1}$=fadd(fadd((fmul $a$, 1),(fmul 0,0)),(fmul 0,0))

instruction sequence after instruction exchange based on special values $c_{1,1}$=move(move((move $a$), (nop)),(nop))

(original) instruction sequence $c_{2,2}$=fadd(fadd(fmul $d$,0),(fmul 1,−1)),(fmul 0,0))

instruction sequence after instruction exchange based on special values $c_{2,2}$=move(decr(nop),(xor sign 1)),(nop))

The above examples show that we can omit all fmul and fadd instruction in these cases:

Multiplications with "0" are marked with explicit bit 0 for the target operand (=result), a "NOP is executed" instead. Multiplications with "1" are replaced with a "move" instruction, multiplications with "−1" are carried out by inverting the sign bit with a XOR instruction applied to the sign bit only.

Additions with "0" are replaced with "move" instruction. Addition with "1"/"−1" is replaced by an "increment"/"decrement" instruction.

For matrix element $c_{1,1}$ three fmul operations and two fadd operations are replaced by three move instructions. For matrix element $c_{2,2}$ three fmul operations and two fadd operations are replace by one move, one decr and one xor instruction. The move instruction is the easiest instructions executed by an execution unit which doesn't alter the value, e.g. a OR "0" for fixed point units.

Alias table extension for explicit bits:

| Logical address | Physical address | Is zero | Is "1" | Is "−1" |
|---|---|---|---|---|
| 23 | 46 | 0 | 0 | 0 |
| 2 | 47 | 1 | 0 | 0 |
| 13 | 48 | 0 | 0 | 1 |

The explicit bit in above example are one-hot encoded and denote special values for logical addresses "2" and "13" being "0" resp. "−1". Logical address 23 contains the value stores in physical register 46 and has no special value. Advantageously, the explicit bits overrule the content of the assigned physical register.

A typical hardware configuration of an information handling/computer system in accordance with the invention preferably has at least one processor or central processing unit (CPU).

The CPUs are interconnected via a system bus to a random access memory (RAM), read-only memory (ROM), input/output (I/O) adapter (for connecting peripheral devices such as disk units and tape drives to the bus), user interface adapter (for connecting a keyboard, mouse, speaker, microphone, and/or other user interface device to the bus), a communication adapter for connecting an information handling system to a data processing network, the Internet, an Intranet, a personal area network (PAN), etc., and a display adapter for connecting the bus to a display device and/or printer (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable (e.g., computer-readable) instructions. These instructions may reside in various types of signal-bearing (e.g., computer-readable) media.

Thus, this aspect of the present invention is directed to a programmed product, comprising signal-bearing (e.g., computer-readable) media tangibly embodying a program of machine-readable (e.g., computer-readable) instructions executable by a digital data processor incorporating the CPU and hardware above, to perform the method of the invention.

This signal-bearing (e.g., computer-readable) media may include, for example, a RAM contained within the CPU 611, as represented by the fast-access storage for example. Alternatively, the instructions may be contained in another signal-bearing (e.g., computer-readable) media, such as a magnetic data storage diskette, directly or indirectly accessible by the CPU. Whether contained in the diskette, the computer/CPU, or elsewhere, the instructions may be stored on a variety of machine-readable (e.g., computer-readable) data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing (e.g., computer-readable) media. Alternatively, other suitable signal-bearing media may include transmission media such as digital and analog and communication links and wireless.

In an illustrative embodiment of the invention, the machine-readable (e.g., computer-readable) instructions may comprise software object code.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of dispatching instructions, comprising:
dispatching original instructions into an instruction buffer, the original instructions including at least one operand;
renaming the at least one operand;
selecting the original instructions from the instruction buffer;
sending selected instructions with explicit bits, which comprise values stored in a mapper table for each of a plurality of physical registers, to an internal operation code exchange table, which includes replacement rules for replacing the selected instructions with a simplified instruction based on the original instructions and the explicit bits;
replacing the selected instructions with the simplified instruction in accordance with the explicit bits; and
issuing the simplified instructions indirectly to an execution unit by sending the simplified instruction and all explicit bits for the operands to a content addressable memory address logic of the internal operation code exchange table, wherein if a bitvector, consisting of the original instruction and the explicit bits, matches a pattern stored in the internal operation code exchange table, the original instruction is replaced by the simplified instruction.

* * * * *